Feb. 4, 1936.    H. F. FLOWERS    2,029,995
DUMP VEHICLE
Filed Nov. 28, 1932    13 Sheets-Sheet 6
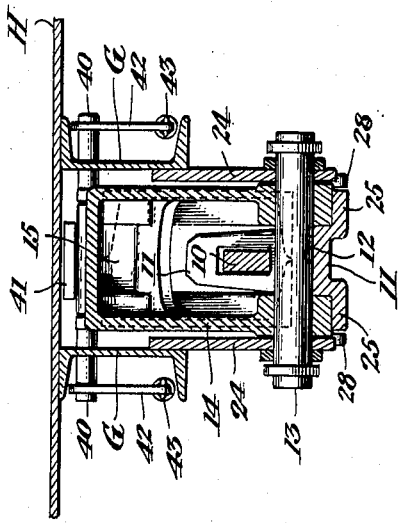
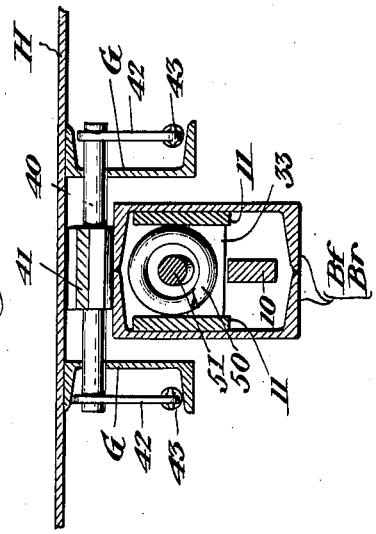
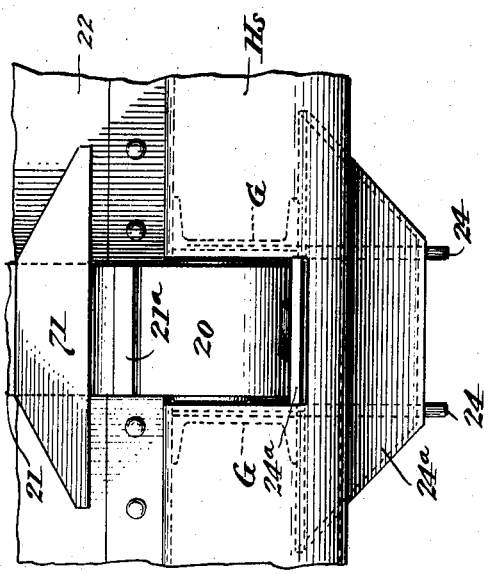
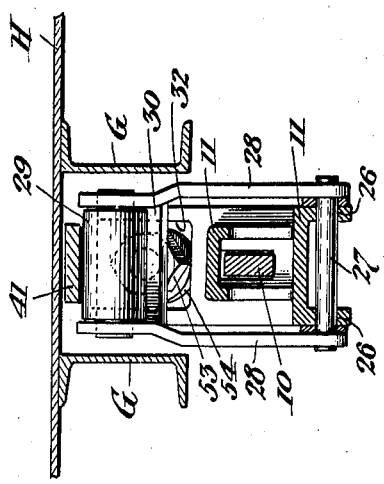
Inventor,
Henry Ford Flowers.
By
Attorneys.

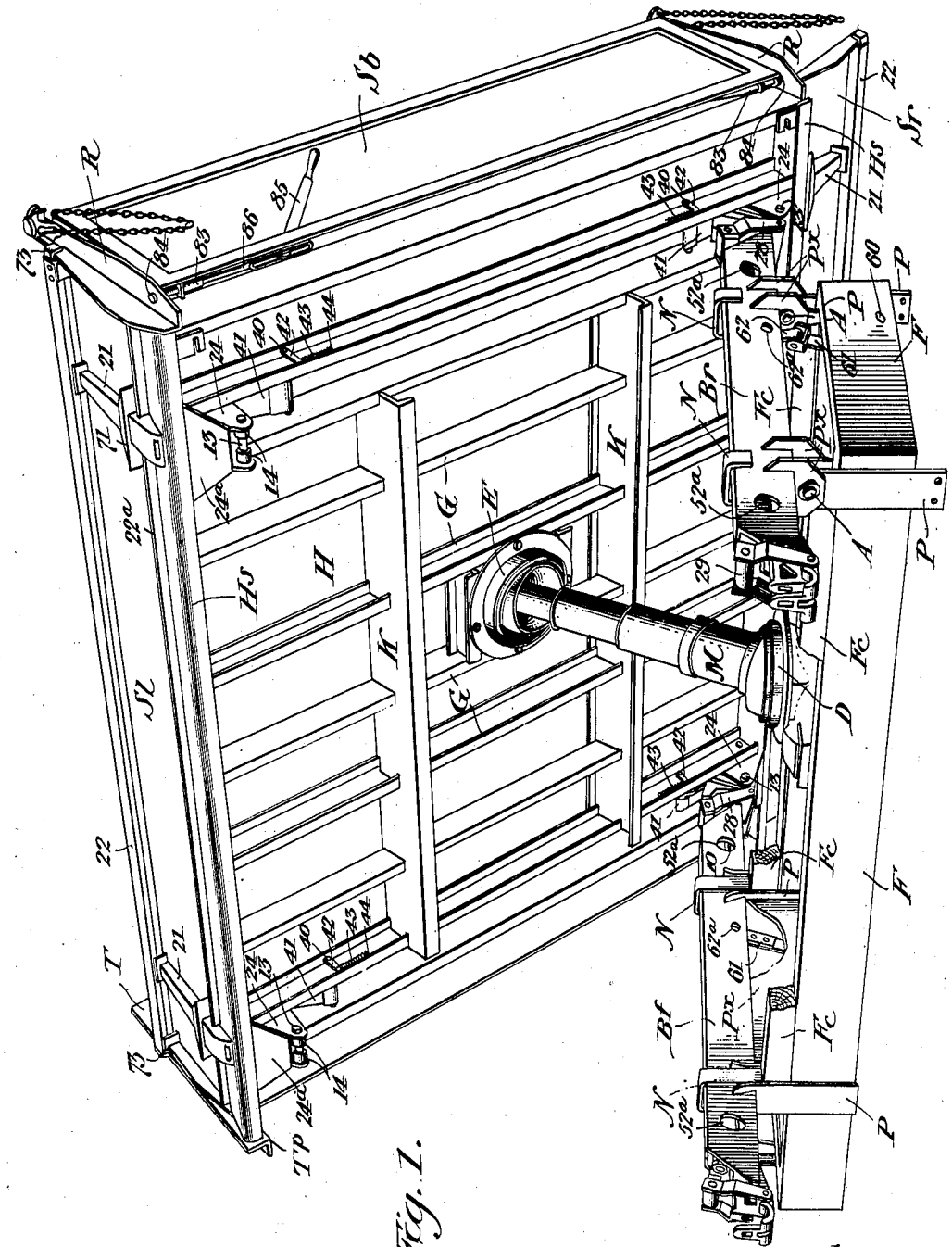

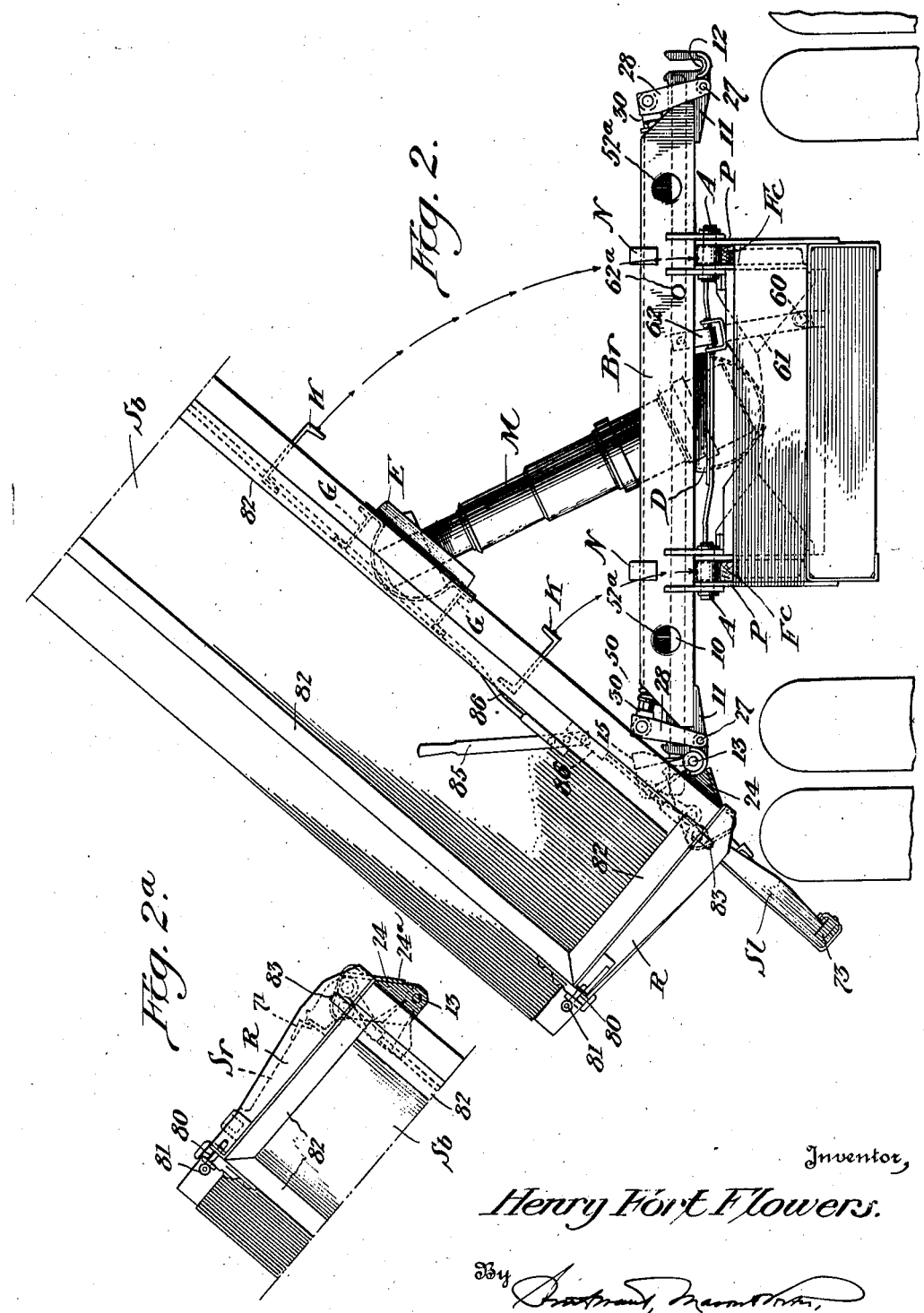

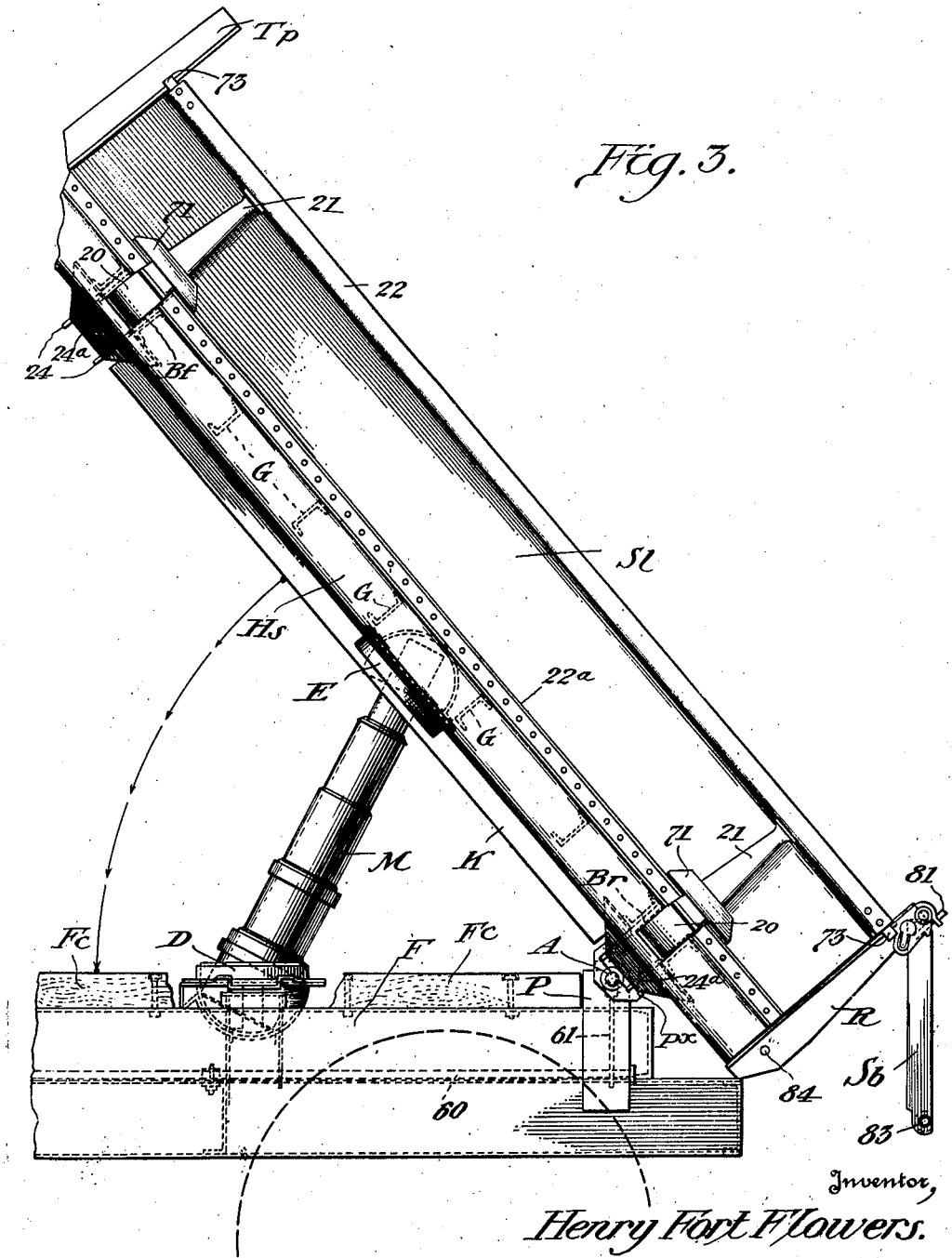

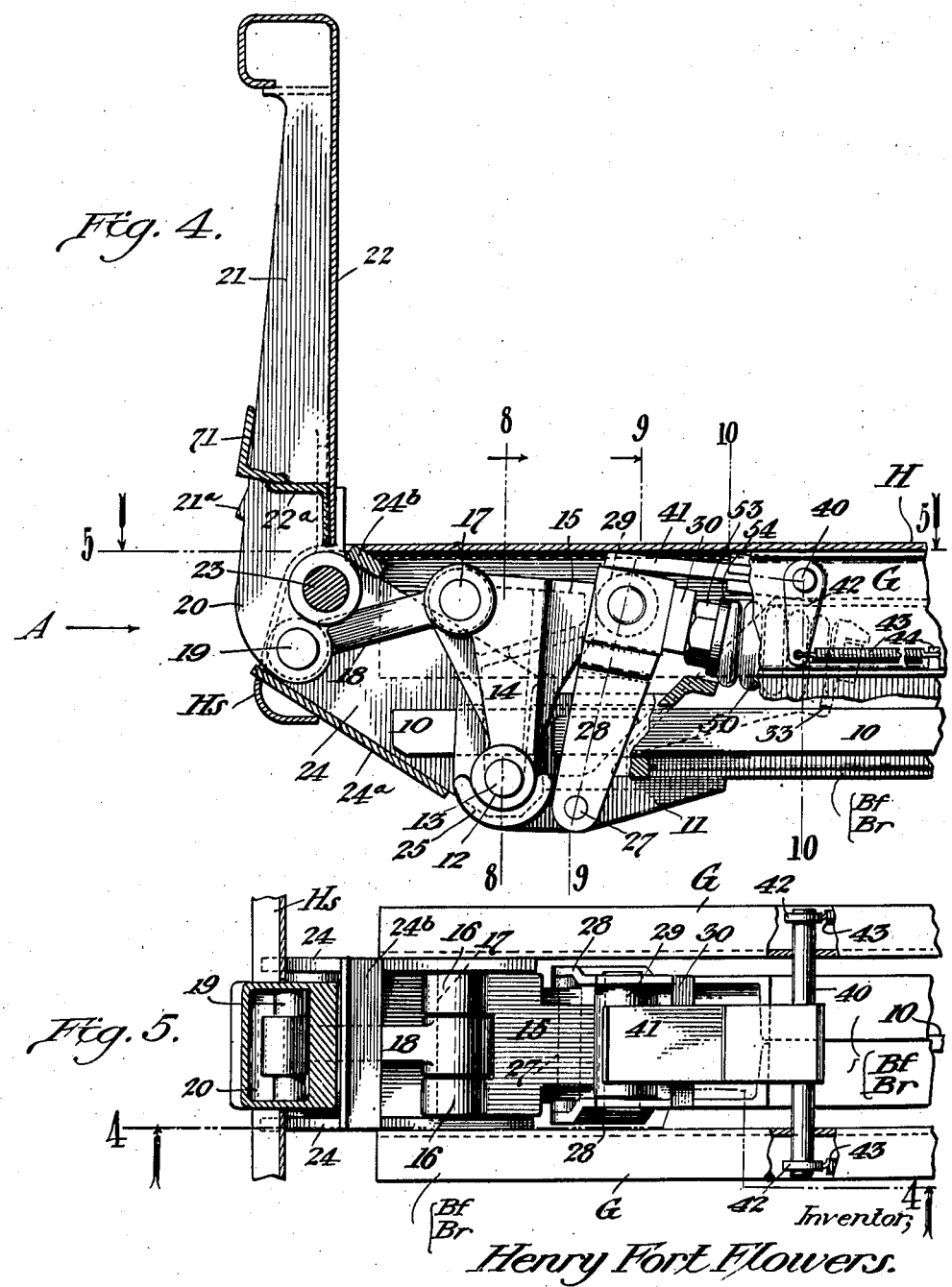

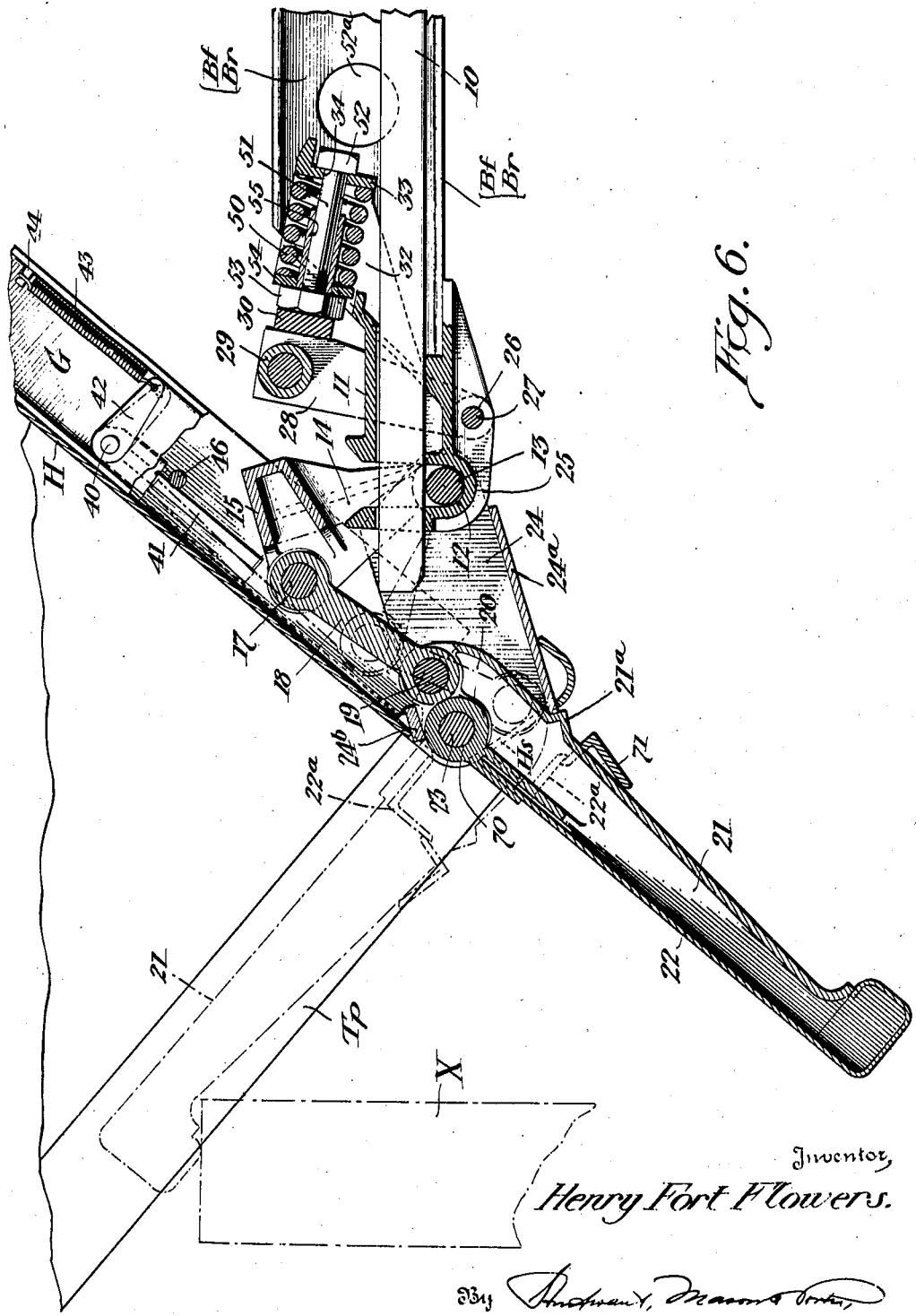

Feb. 4, 1936. H. F. FLOWERS 2,029,995
DUMP VEHICLE
Filed Nov. 28, 1932 13 Sheets-Sheet 7
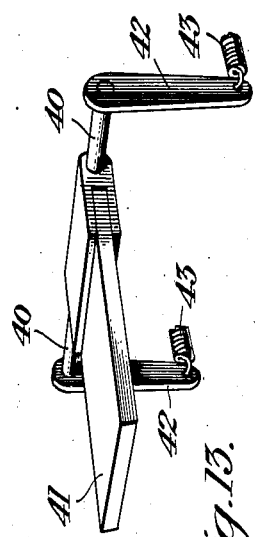
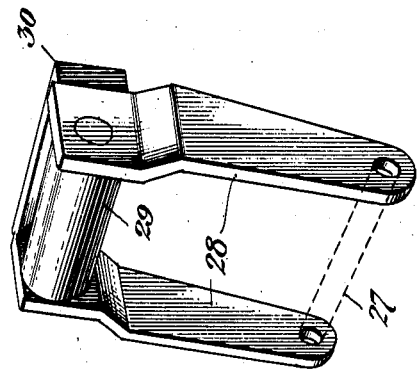
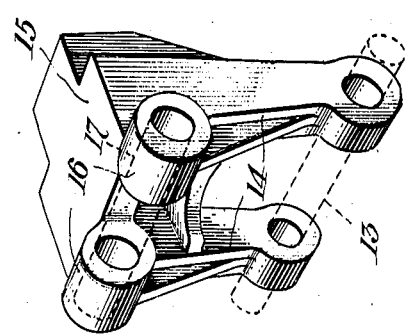
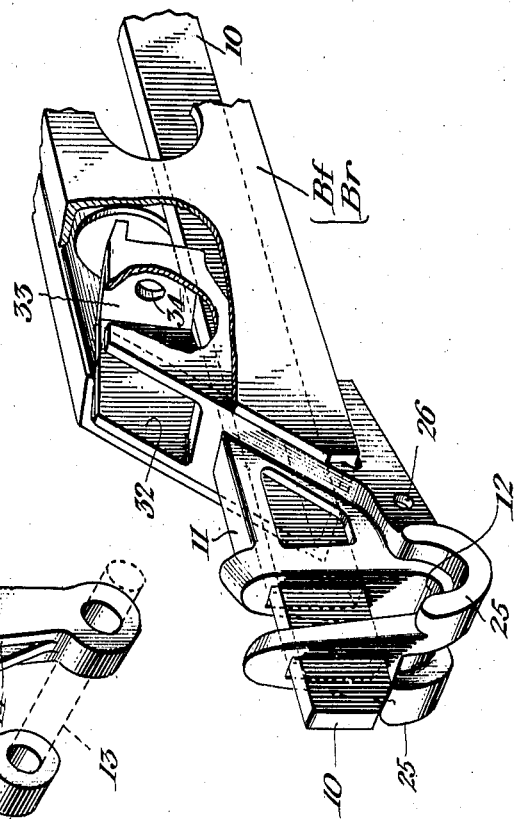
Inventor,
Henry Fort Flowers.

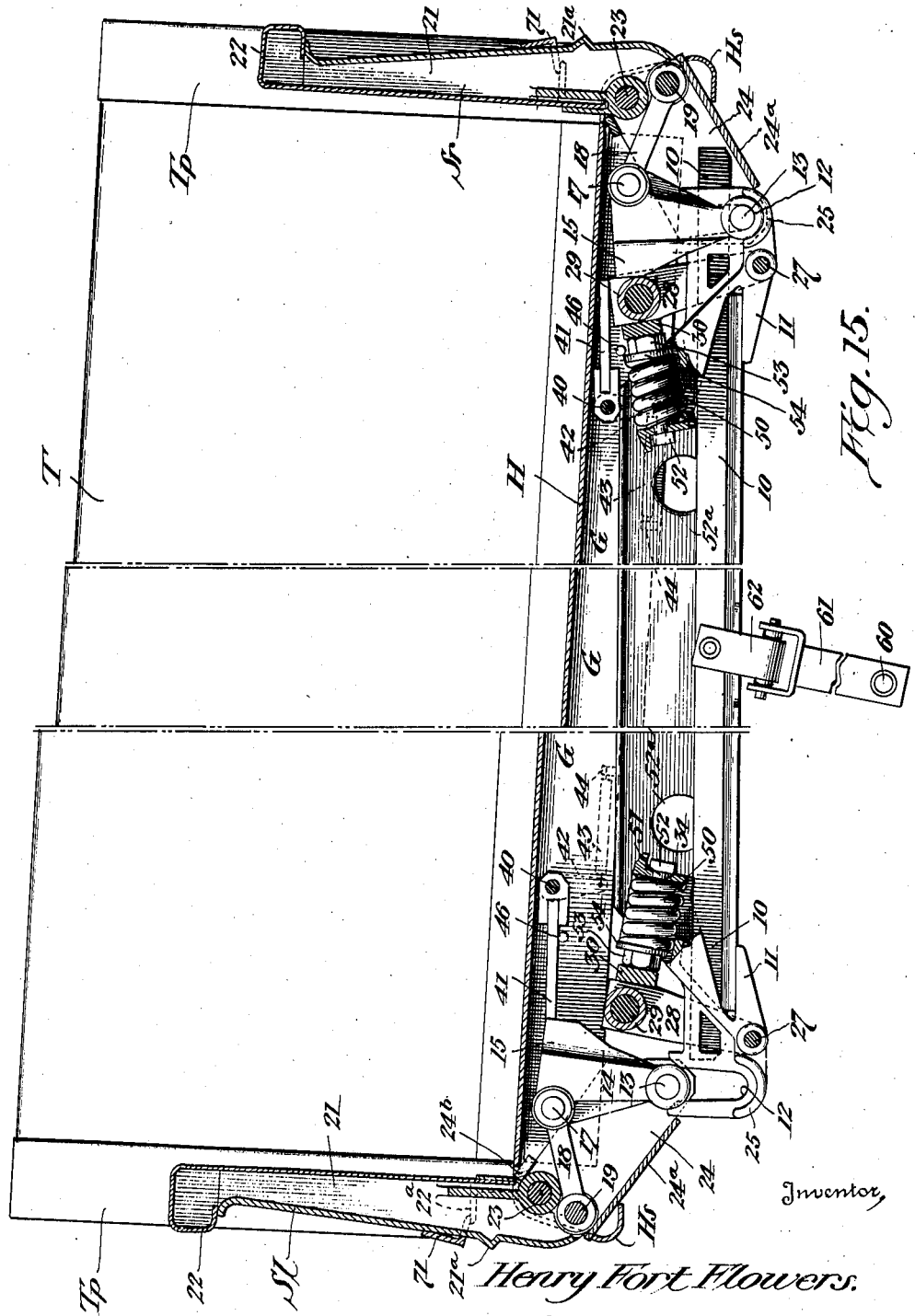

Feb. 4, 1936.  H. F. FLOWERS  2,029,995
DUMP VEHICLE
Filed Nov. 28, 1932   13 Sheets-Sheet 9

Inventor,
Henry Fort Flowers.
By
Attorneys.

Feb. 4, 1936.　　　H. F. FLOWERS　　　2,029,995
DUMP VEHICLE
Filed Nov. 28, 1932　　　13 Sheets-Sheet 10
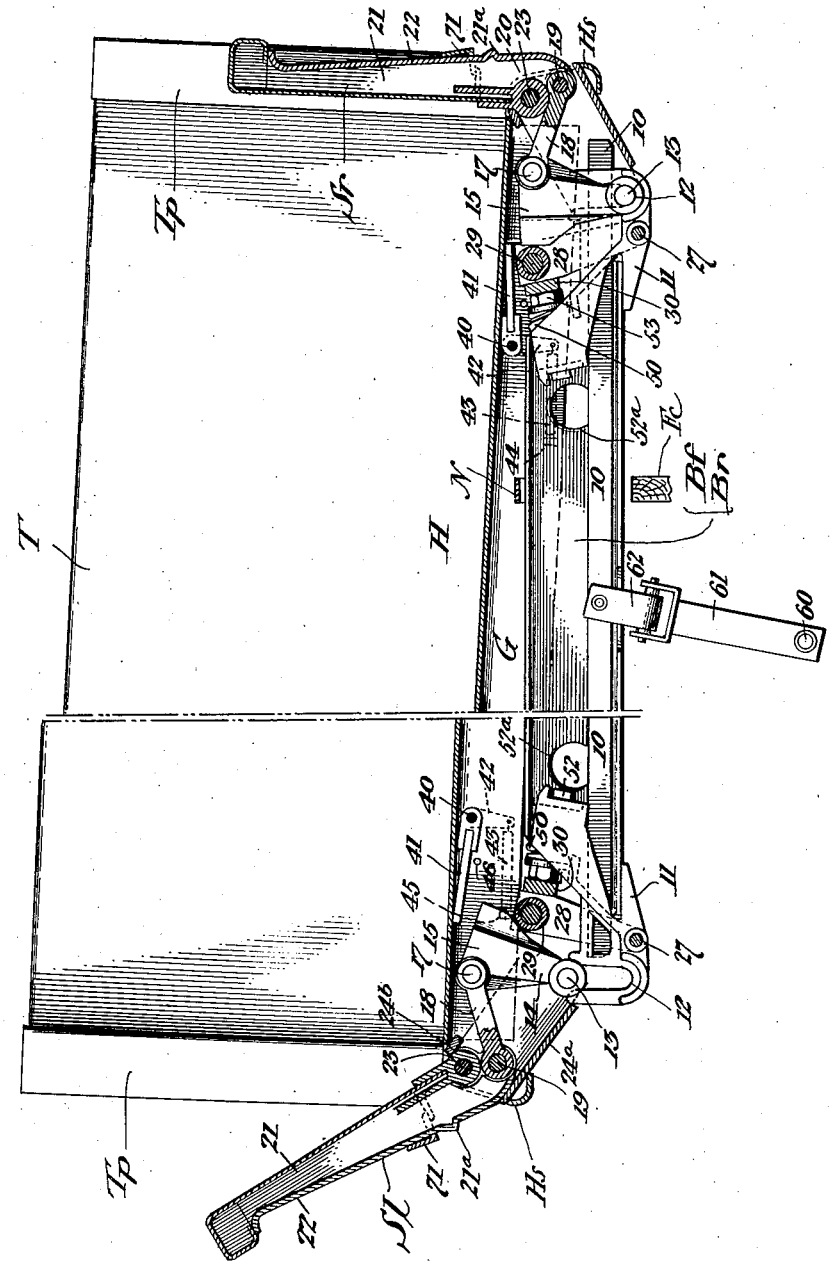
Inventor,
Henry Fort Flowers.
By 
Attorneys

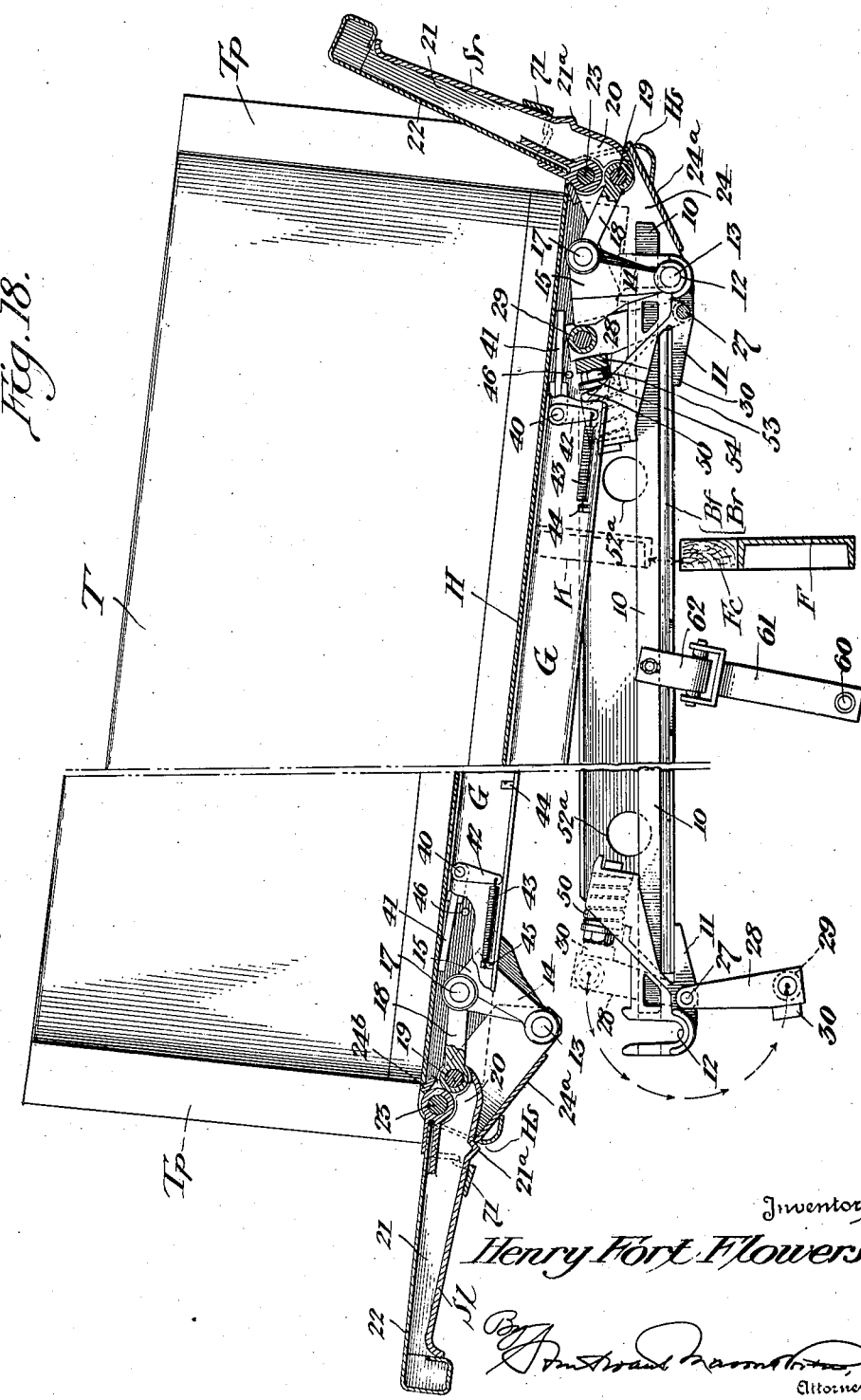

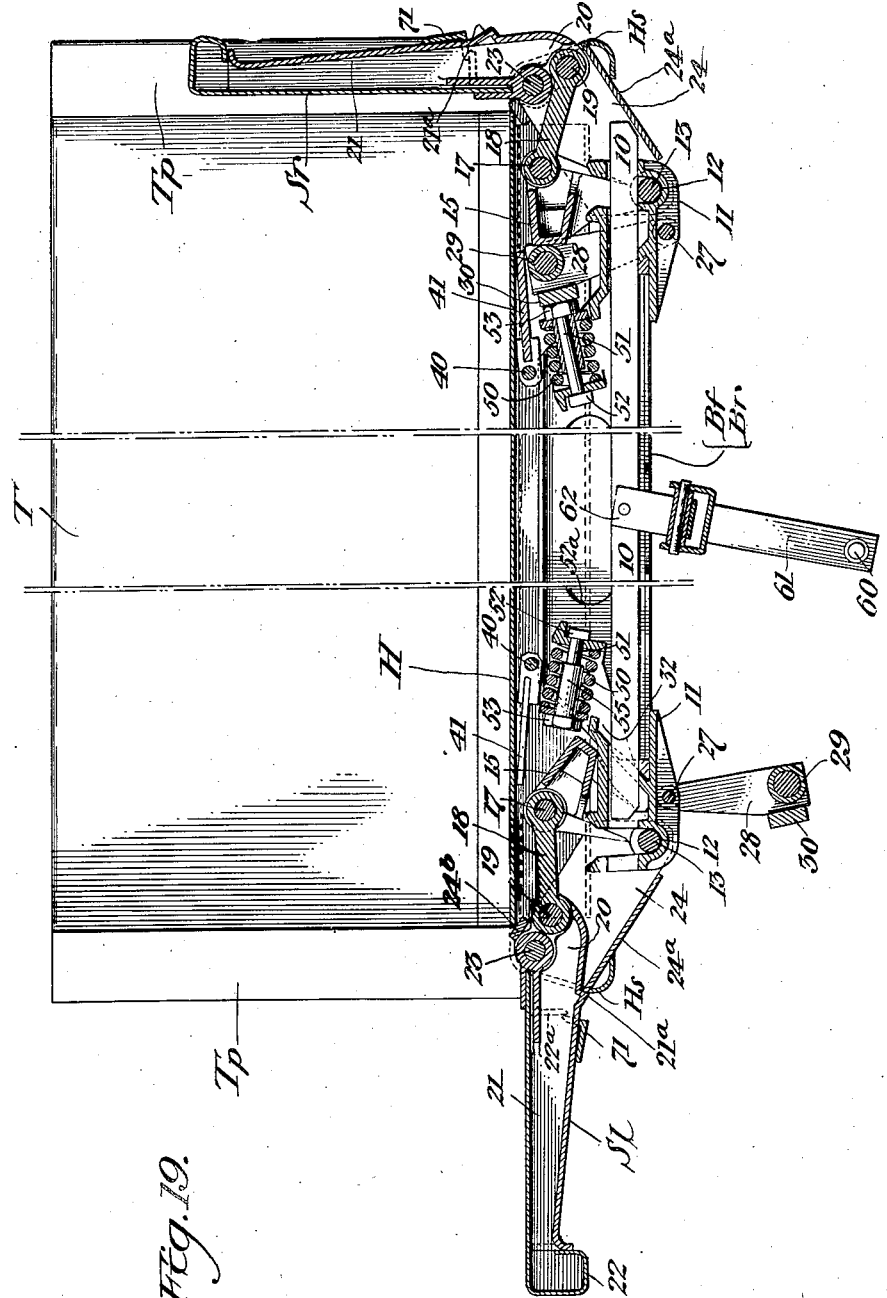

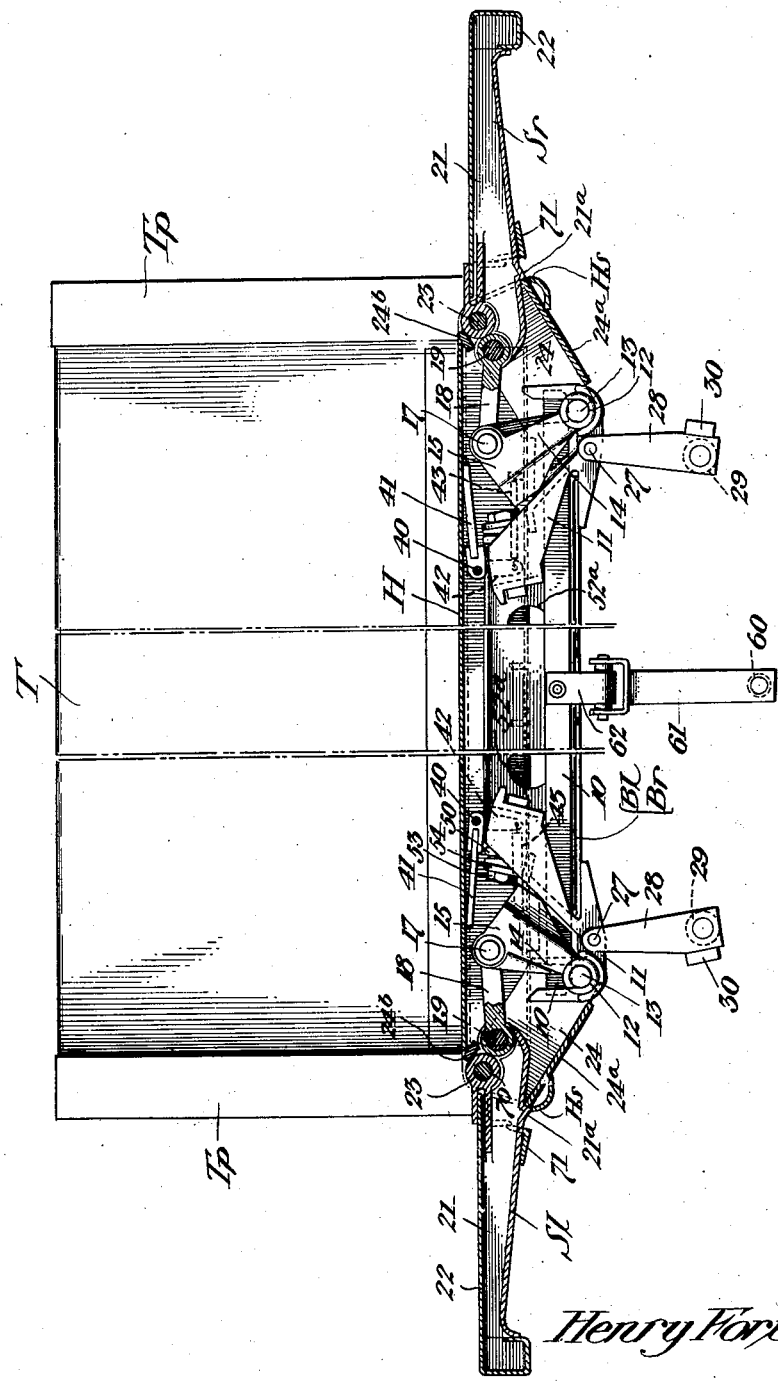

Patented Feb. 4, 1936

2,029,995

UNITED STATES PATENT OFFICE 2,029,995

DUMP VEHICLE

Henry Fort Flowers, Findlay, Ohio

Application November 28, 1932, Serial No. 644,733

28 Claims. (Cl. 298—18)

This invention relates to improvements in vehicles of the type which may be operated to discharge their loads by tilting, and more particularly concerns a vehicle which may be so operated in three different directions for dumping discharge.

One of the features of the present invention is the provision of a dump vehicle having a door past or through which dumping may be effected, together with means for controlling the door movement and producing a positive closing of the door during the return of the body from tilted position by the employment of a member which may, however, be moved from one position to another and thereby rendered non-effective for producing a positive closing of the door.

Another feature of the present invention is the provision of a dump vehicle having a body and a door pivoted thereto, and door controlling devices for producing a positive closing of the door during a return of the body from tilted position whenever the door be open, and whether this tilting has occurred about a fulcrum adjacent or remote from said door.

Another feature of the present invention is the provision of a dump vehicle having a body and a door pivoted thereto, in which a positive closing may be accorded the door during the return of the body from tilted position, whereby the door is brought to a substantially upright position for transport or in which the door may be so controlled that it is in a horizontal position during transport.

A still further feature of the present invention is the provision of a frame and body, together with a rear bolster which may rock about a transverse axis, fulcrum members on the frame, body and bolster for permitting the tilting of the body toward one or another side, and in which the body and rear bolster may tilt together for dumping to the rear.

A still further feature of the present invention is the provision of a frame and a dump body, a rear bolster mounted on a transverse axis with respect to the dump body, and fulcrum members on the frame, body and bolster for providing laterally spaced fulcrums about which the body may tilt for lateral dumping, the body and bolster moving about the transverse axis for rear dumping, together with means for selectively determining the direction of tilting of the body and cooperative with said fulcrum members to this effect.

Further features of the present invention are set forth in the following description and claims, in conjunction with an illustrative form of practicing the invention which appears in the accompanying drawings.

In the drawings:

Figure 1 is a perspective view of the parts in position for side dumping.

Figure 2 is a rear end view, with the parts in side dumping position.

Figure 2a is a detail view, representing the right-hand side of the truck body of Figure 2, in corresponding position.

Figure 3 is a fragmentary side elevation of the body in position for rear dumping.

Figure 4 is a transverse vertical section of one of the door control units, with the door in closed position, substantially on line 4—4 of Figure 5.

Figure 5 is a horizontal sectional view, substantially on line 5—5 of Figure 4.

Figure 6 is a view corresponding to Figure 4, but with the body tilted and the door open, showing in dot-and-dash lines the door when obstructed and free from opening movement.

Figure 7 is an elevational view of the door hinge, on the scale of Figure 4, seen from the direction of the arrow Ar thereof.

Figure 16:
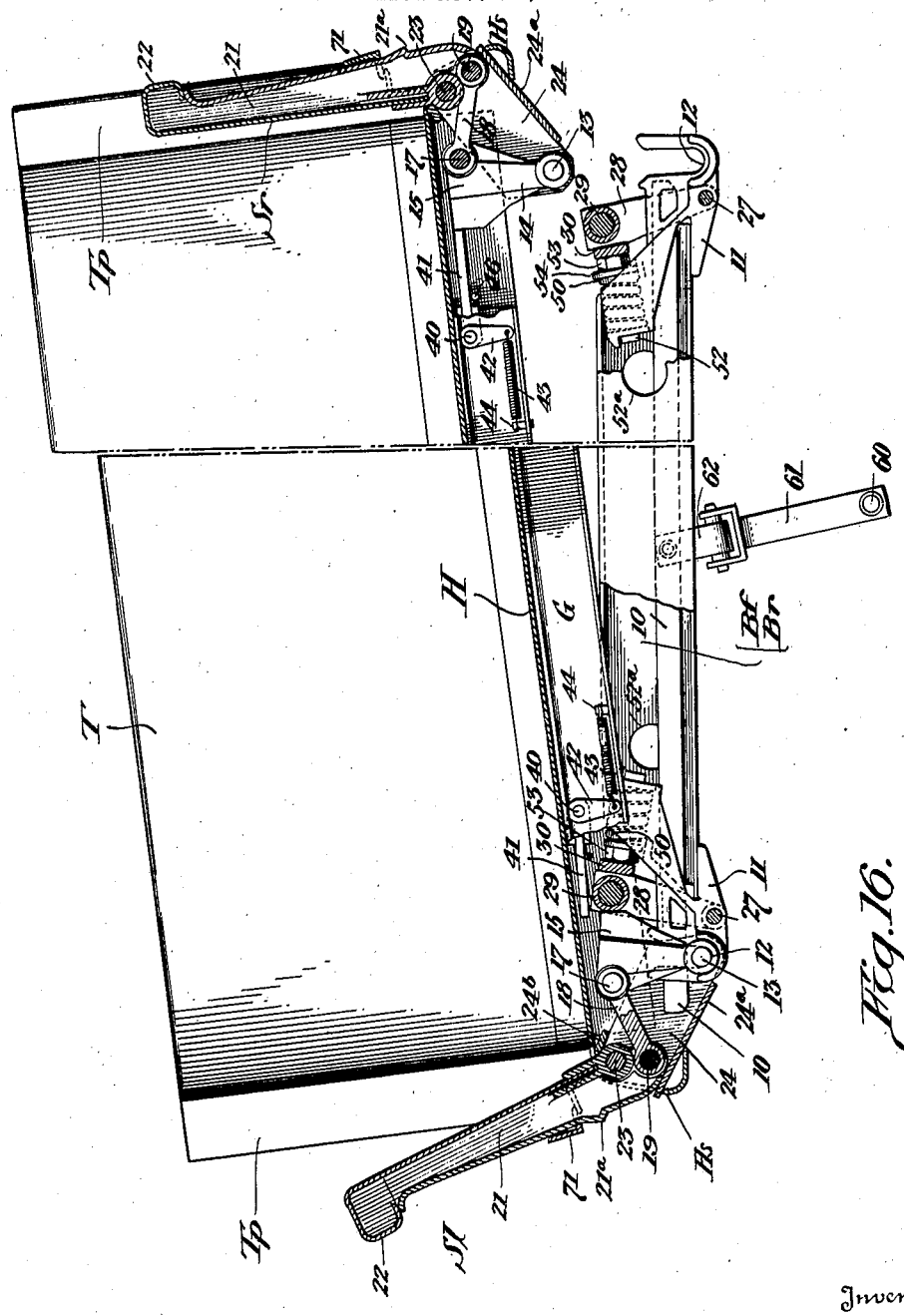

Figures 8, 9, and 10 are vertical sectional views substantially on lines 8—8, 9—9, and 10—10 of Figure 4.

Figure 11 is a perspective view of a part of the frame structure, showing the body support, latch bar, and spring pocket.

Figure 12 is a similar perspective view showing the door control rock arm.

Figure 13 is a similar perspective view of the door control latch lever.

Figure 14 is a similar perspective view showing the spacer member of the door control.

Figure 15 is a transverse vertical sectional view showing the position of the parts after the sliding tilting movement of the body.

Figures 16, 17, 18, 19, and 20 are transverse sections representing the position of parts under various conditions and at various stages of operation.

In Figure 1 the frame F is illustrated as presenting a rectangular shape in the horizontal plane and having upstanding therefrom members constituting posts P, adjacent the front and rear ends of the frame F, for supporting the transverse front and rear bolsters Bf and Br. The front bolster Bf is fixed rigidly to its posts P as by welding, while the rear bolster Br is provided with plate members Px which interengage with the top ends of the rear posts P and are connected therewith by the pivots A about which the body may fulcrum during dumping toward the rear. A power unit M is connected by a ball and socket joint D to the frame F, and by a ball and socket joint E to the cross beams G which reinforce the bottom H of the body. These beams G are reinforced by longitudinal members K which, when the body is in lowered or transport position, are located between and adjacent the pads N of the bolsters Bf and Br to assist in preventing longitudinal movement of the body relative to the frame; and rest upon the wood cushions Fc bolted to the frame F. These cushions Fc relieve the body-frame fulcrum during normal transport, and absorb shocks caused by dropping boulders or heavy material upon the floor. The body includes besides the bottom H a left-hand side door Sl and a right-hand side door Sr, which are mounted as hereinafter described for downward swinging movement of opening, and a rear door Sb which may be swung about either its top or its bottom pivot point for opening. The bottom H of the body is provided at the sides with the downturned skirts Hs which are illustrated as formed by bending the body bottom H (Figure 4), and is provided at the rear corners with angle members R which carry the pivots for the rear door Sb. The front of the body is closed by a front end plate T having front posts Tp.

It is preferred to mount the power unit M so that its vertical axis when in transport position is farther from the transverse line of centers of the pivots A than it is from either of the lateral fulcrum axes of the body.

Each of the bolsters Bf and Br is illustrated as constructed of two channel members with their recesses directed toward one another (Figure 11) for the reception of a latch bar 10. At each end of each bolster it is provided with an end member 11 (illustrated as a casting) which is rigidly joined to the bolster structure proper and is provided with an upwardly open bight having a surface 12 for the reception of a body pivot 13. Surrounding this body pivot is a stirrup-shaped rock arm (Figure 12) having its legs 14 joined by an abutment piece 15, and having the eyes 16 thereon for the reception of the door link pivot pin 17, and between which is received the end of the door link 18 (Figures 4 and 6) which is connected at its other end by the pin 19 to the depending end 20 of the reinforcing arm 21 which supports the door sheet 22. This door arm 21 is mounted by a pivot pin 23 carried by plate members 24 connected to the door reinforcing beams G and extending therebelow and connected by the tie plate 24a, and likewise carrying the body pivot 13. The eyes at the lower ends of legs 14 of the rock arm are preferably themselves directly supported by the arcuate ribs 25 provided on the bolster end member 11. Plate 24a cooperates with ridge 21a of the door arm, and stop piece 24b with the door extension 20, to limit the opening movement of the door relative to the body.

This bolster end member 11 is likewise provided with apertures 26 (Figure 11) for receiving the pivot pin 27 which supports the legs 28 of a spacer member (Figure 14) having a roller 29 pivotally carried at its upper end and a connector web 30 rigid with the legs 28. The roller 29 is at a sufficient distance from the axis of its pivot pin 27 so that the spacer structure may be swung clear of the bolster end member 11 (Figure 18) when desired.

The bolster end member is likewise provided with a spring pocket 32 having an end wall 33 provided with a central aperture 34, all located inside the bolster channels (Figure 11).

A control latch lever (Figure 13) is supported by a pivot shaft 40 on the body bottom reinforcing beams G (Figures 1, 4, and 6), and includes a latch piece 41 fixed to this shaft and adapted under the conditions set forth hereafter to encounter and hold the rock arm abutment 15 (Figure 15, left) or to be raised into position to permit the free movement of the abutment 15 thereunder (Figure 17). For this purpose, the shaft 40 is provided with the fixed arms 42 having springs 43 which may be secured alternatively to the pins 44 or 45 (Figure 16, and Figure 17, left) on the adjacent body reinforcing beams G. A stop 46 between adjacent beams G limits the downward rocking movement of the latch piece 41 (Figure 6).

The connecting web 30 of the spacer member legs 28 may be supported, as stated, on a cushioning structure (Figure 6) including the cushion spring 50 located in the spring pocket 32 and surrounding a bolt 51 passing through the aperture 34 and having a head 52 on the inner side of the closing wall 33 of the spring pocket. The other end of the bolt 51 is provided with a nut 53 which supports the web 30 when these parts are in contact and permits adjustment of the initial spring compression. A washer 54 receives the thrust of the cushion spring 50 in its reaction against the end wall 33 of the spring pocket and transmits this to the nut 53. A sleeve 55 is interposed between the spring and the bolt 51 and serves to limit the endwise movement of the bolt under stresses transmitted from the web 30. Apertures 52a in the bolster channel beams permit placing and replacing the bolts 51, 52.

In Figures 1, 2, 4, 6, and 13, the latch bars are shown as capable of transverse sliding movement with respect to the body, so that they may be selectively operated to engage and hold the body pivots 13 upon the bight walls 12. The rear latch bar is preferably longer than the front one, so that when they are centralized, the front latch bar releases both the front body pivots while the rear latch bar holds both rear body pivots. Upon movement of both bars to the left, both left pivots are engaged, and the right pivots released, so that tilting about the left fulcrum must occur. Upon movement of both bars to the right, similarly, a tilting about the right fulcrum is conditioned. To this end a body latching shaft 60 extends longitudinally of the vehicle and is provided beneath each bolster with an arm 61. Each arm 61 is pivotally connected to the corresponding latch bar 10 so that rocking movement of the longitudinal body latch shaft 60 will produce endwise movement of the latch bars 10. At the rear bolster, this connection occurs by a pivot, which is horizontal and aligned with pivots A when the arm 61 is in raised position (i. e. with both bight walls 12 covered by the latch bar 10, to a connection piece 62). Openings 62a in the bolster channels permit access to the latch bar pivots.

The side doors are illustrated (Figures 1, 3, 4, and 6) as having on each arm 21 a pivot eye 70 for receiving the pivots 23, and the sheets 22 are rebent at their upper ends to provide a closed door structure which is further reinforced at the position of the door arms by the angle members 71, and therebetween by the angle pieces 22a (Figures 3, 4, 6, and 7). At the ends, the top rebent portion of the sheet 22 is provided on the exterior with clip pieces 73 which fit over the laterally extending portions on the rear corner angle posts R and the corresponding legs of the front posts Tp (Figures 1 and 3).

The rear door Sb (Figures 1, 2, and 3) is provided at its upper corners with the top pivot pins 80 which are received in rearwardly open notches on the rear posts R and may be detained therein by the securing pins 81 when it is desired to hold the rear door either in fixed position or for opening about its top pivot axis into the position shown in Figure 3, for example.

The rear door is reinforced by peripheral irons 82 and adjacent its lower edge is provided with lower pivot pins 83 which may be slid in the directions of their axes through transverse openings 84 in the rear posts R (Figure 3) and thus provide also pivots about which the rear door may swing downward for opening movement. A lever 85 is provided on the rear door and is pivotally connected to links 86 which are operatively joined to the pins 83 so that these pins may be moved together.

The operation of the vehicle is as follows:

When the vehicle is in transport position (Figure 4), it may be loaded as usual. The side doors are held in closed position; any outward movement of the tops of the doors occasions a compression of door links 18 between their pivots 19, 17 and this tends to move the rock arm, which swings about body pivot pin 13 and presses its abutment 15 against the roller 27 of the spacer member, and the latter in turn tends to rock about its pivot pin 27 and press its web 30 against the nut 53 and thus compress the cushion spring 50. Hence, if the door is struck by a steam shovel bucket, for example, during loading and forced outwardly, this cushion spring prevents breakage of parts.

Upon arrival at a desired point for lateral dumping, the operator of the vehicle may shift the latch bars 10 by appropriate rocking of the longitudinal body latch shaft 60 to release the latch bars 10 from the bight walls 12 at the side of the body opposite that at which dumping is to be effected (Figure 2). The power unit M is then actuated. Since the body is latched to the frame at, for example, the right-hand end of each bolster, the body is compelled to tilt upon the operation of the power unit M toward the position shown in Figure 2. The door now, of its own weight, or under the action of the load, tends to rock in a counterclockwise direction from the position of Figure 4 into the position of Figure 6, turning about the door pivot 23 relative to the body. Owing to the separation of the pivot pins 13 of the body and 23 of the door, the downward extension 20 of the door is permitted to move in a counterclockwise direction under the control of the link 18 which operates in compression and transmits the forces to the rock arm abutment 15, the spacer member roller 29 and web 30, and thus to the bolt and cushion spring 50 and to the end wall 33, at which the door thrust is taken up by the bolster. This movement continues until the rib 21a on the door encounters the bottom portion 24a of the depending member 24 on the body (position of Figure 6) at which further opening movement of the door with respect to the body is prevented. It is preferred that in this position the door sheet 22 should be parallel to the body bottom H. Thereafter, however, farther tilting of the body will cause the link 18 to operate in tension and thus pull the abutment 15 away from the roller 29 of the spacer member, into the position shown in full line in Figure 6.

Thus the door opens at a controlled rate during the initial portion of the body tilting, until it reaches the fully open position; and thereafter the body and door travel together to the limit of the body tilting movement.

If, however, the door at any point of its travel encounters an obstruction such as the block X of Figure 6, it is detained against movement, and hence the further tilting of the body will produce a relative closing of the door with respect to the body into the position shown in dot-and-dash lines in Figure 6. This, however, produces a strain in link 18 and therewith a counterclockwise rocking of the rock arm legs 14 and abutment 15 away from the roller 29 on the spacer member. It will be noted therefore that such an obstruction cannot cause breakage of the door or body parts.

When the body is permitted to return from tilted into transport position, the abutment 15 again comes into contact with the roller 29 and a compression is again exerted on the link 18, causing a clockwise rotation of the door parts and a positive return of the door into the closed position of Figure 4 again.

During this time, however, the door at the raised side of the body has been maintained in closed position. As shown in Figure 15, the raising movement of the body (in this case at the left) has withdrawn the body pivot pin 13 from the bight wall 12, as the latch bar 10 is in its right-hand position. As the wall of abutment 15 raises, it is held in substantially its former position by the roller 29, until the latch member 41 (which has been resting on top of the spacer member as shown in Figure 4) has opportunity to drop against the inner face of this abutment member 15 under the urgency of its springs 43, and be held in this position by engaging the stop 46. Thus, this side of the body in rising produces an automatic latching of the door at this side and thereafter the link 18 operates in compression upon the abutment member 15 and thus upon the latch member 41 and its shaft 40 to transmit any tendency toward opening of this door to the body bottom beams G. During the return of the body from tilted position, the body pivot pins 13 enter the bight and the abutment 15 comes against the roller 29, and ultimately the downward movement of the body causes the engagement and lifting of the latch member 41 into the transport position of Figure 4 again.

By moving the latch bars 10 into the central position, the body bolts 13 at the front bolster are released at both sides, but the body bolts at the rear bolster remain locked at both sides owing to the greater length of the rear latch bar 10 as aforesaid. Hence, upon energization of the power unit M, the rocking of the body and its rear bolster must occur about the pivot axes A into the position shown in Figure 3; and dumping occurs at the rear of the vehicle with appropriate opening of the rear door Sb.

It is, however, also possible to employ the body for transporting articles which are larger than the transverse dimension between the doors when closed. This is accomplished as shown in Figures 17, 18, 19, and 20.

If only one door is to be brought to and left in a lowered position during transport, the springs 43 of the latches at one side of the body are shifted from pins 44 to pins 45 (position of Figure 17, left), and the latch bar 10 is moved toward the opposite side. The power unit M is energized as before. The door Sl (Figure 17) now tends to turn about its pivots 23 with compression of the links 18. The abutment 15 of the rock arm is no longer detained against clockwise rocking movement by the latch member 14, and hence tends to travel over the roller 29, at a rate regulated by the shape of its inward face, in proportion to the tilting movement of the body until ultimately the door reaches its fully opened position with respect to the body and is again detained against further opening movement by the engagement of rib 21a with the plate 24a (Figure 18). The tilting of the body may be interrupted when the body pivot 13 and adjacent parts are clear of the path of swinging movement of the spacer member, and the latter may now be swung (arrows, Figure 18) around the end of the bolster. The power unit is now relieved and the body permitted to return to its transport position. The abutment 15 no longer encounters the roller 29 during its descent, and hence the door remains open and ultimately attains the position of Figure 19, in which it provides a lateral extension of the body bottom H as shown.

Obviously, the door may be returned to closed position for carrying bulk loads by again raising the body at the side adjacent the door into the position of Figure 18 and returning the spacer member in the direction opposite to the arrows of Figure 18, attaching the springs 43 to posts 44, and again lowering the structure.

This capacity of having the door in lowered position is of great value in hand-loading as it is unnecessary for the shovelers to lift the load over the top of the door.

Further, by effecting this operation at both sides, the two doors may be brought to position in extension of the body bottom, as shown in Figure 20.

The cushion springs 50 are of value in such hand-loading as just described, with one or both doors lowered; since it is then possible, in restoring the doors to raised position by raising the body, readjusting parts, and lowering the body, to close the doors upon the load, even if a part of the load becomes engaged between an end of the door and a corner post or the door similarly is blocked against closing, as the link 18 operates in compression, abutment 15 is moved along with roller 29 and the web 30 to compress the cushion springs 50, so that door and body parts are not broken. This same capacity of yielding is of value in the event of dumping a part of the load and then returning the body to transport position.

By adjusting the over-all length of the bolts and their nut 53, and of the initial compression of the springs 50, it is possible to have the doors close neatly, and without resistance by the cushion springs, until the body is almost resting upon all its pivots 13, and then a compression of the cushion springs 50 is accomplished during the slight remaining movement, to establish a sealing relationship of the door with the body which is controlled by the adjustment of initial compression of the cushion springs 50; this particularly being possible by employing washers 54 of varying thicknesses in accordance with the initial pressure desired.

Particular value of the construction resides in the holding of the doors in vertical position by springs under initial compression; the possibility of quick opening of the doors so that they move to fully open position during the tilting of the body through a relatively small arc; the arrangement of the doors so that they may be closed relative to the body when the body is in fully tilted position; along with mechanisms whereby the doors may be brought by operation of the door control devices into and kept in open position while the body is horizontal; and in which these mechanisms further operate to permit tilting of the body in any direction while both side doors are fully opened.

It will be noted that the body may be tilted to either side or to the rear, regardless of whether the doors are in upright or horizontal position during the normal transport: and that the positive closing action is only accomplished when the spacer members are in position for engaging the other door controlling devices. Thus the operator of the vehicle is able to determine exactly the conditions of operation desired. Loads may be transported on the vehicle with the doors raised or lowered, and these loads dumped by a tilting operation of the body without affecting the position to which the doors will be returned on return of the body from tilting position: or the raised door may be brought, if desired, from an open to a closed position during the return of the body, if such be desired.

It will be understood that the invention is not limited solely to the forms of construction shown, but that it may be modified in many ways within the scope of the appended claims.

Having thus described the invention, what I claim as new and desire to secure by Letters Patent, is:

1. In a dump vehicle, a frame, a body, members on said body and frame for providing a lateral fulcrum about which said body may tilt, a downfolding side door pivoted on said body, and door controlling devices for positively closing the door during return of the body from tilting about said fulcrum and for maintaining the door closed during transport and during raising movement of the body relative to the frame adjacent said fulcrum, said devices including means which may be shifted for rendering the devices inoperative for effecting a positive closing of the door, and also including means on said frame, body and door which are effective for preventing accidental shifting of said shiftable means while the body is in transport position.

2. In a dump vehicle, a frame, a body, members on said body and frame for providing a fulcrum about which said body may tilt, a downfolding door pivoted on said body, and door controlling devices carried by the body and frame for positively closing the door during return of the body from tilted position, said devices including a displaceable compression member movable between effective and non-effective positions, said compression member when in non-effective position being free from compression during the return of the body, whereby said devices may be rendered inoperative for effecting a positive closing of the door, and means carried by the body and frame for preventing movement of said compression member from effective position while the body is in transport position.

3. In a dump vehicle, a frame, a body, members on said body and frame for providing a fulcrum about which said body may tilt, a downfolding door pivoted on said body, and door controlling devices carried by the body and frame for positively closing the door during return of the body from tilted position, said devices including a swingable member pivoted to said frame and movable between effective and non-effective positions, said swingable member when in non-effective position being inoperative to effect a positive closing of the door, said body, frame and devices being effective when said body is in transport position for preventing accidental movement of said swingable member to its non-effective position.

4. In a dump vehicle, a frame, a body, a side door pivoted on said body, members on said frame and body for providing laterally spaced fulcrums about which the body may tilt for dumping, normally inoperative means on said body displaced automatically into an operative position during tilting of the body about the opposite fulcrum for preventing opening movement of said door, and means on said frame cooperative with the said door and body for producing a positive closing of the door during the return of the body from tilting about either the adjacent or opposite fulcrum.

5. A dump vehicle as in claim 4, in which said frame means operates during the return of the body from tilted position for disengaging said body means and automatically returning it to inoperative position.

6. In a dump vehicle, a frame, a body, a side door pivoted on said body, members on said frame and body for providing laterally spaced fulcrums about which the body may tilt for dumping, a rocker pivoted on the body and operatively connected with the door, shiftable means on said body for preventing movement of the rocker whereby said door is held closed during tilting about the opposite fulcrum and automatically moving into preventing position upon said tilting, and means on said frame cooperative with the said rocker for producing a positive closing of the door during the return of the body from tilting about either the adjacent or opposite fulcrum and operating to disengage said shiftable means from preventing position during return of the body from tilting about the opposite fulcrum.

7. In a dump vehicle, a frame, a body, a side door pivoted on said body members on said frame and body for providing laterally spaced fulcrums about which the body may tilt for dumping, and door controlling devices for positively closing the door during return of the body from tilting about either said fulcrums, said devices including a movable means whereby said devices may be rendered inoperative for effecting a positive closing of the door and also including elements for preventing movement of said means while the body is in transport position.

8. In a dump vehicle, a frame, a body, a door pivoted on said body, separable members on said frame and body for providing laterally spaced fulcrums about which the body may tilt toward either side for dumping and which may be separated when the body is raised adjacent one of said fulcrums, a rocker pivoted on the body and operatively connected with the door and normally free for rocking movement relative to said body, shiftable means on said body for preventing movement of the rocker and automatically movable into an operative position during separation of said members whereby said door is held closed, and means on said frame cooperative with the said rocker for producing a positive closing of the door during the return of the body from tilting about the adjacent fulcrum.

9. In a dump vehicle, a frame, a body, a door pivoted on said body, separable members on said frame and body for providing a fulcrum about which the body may tilt for dumping and which may be separated when the body is raised adjacent said fulcrum, a rocker pivoted on the body and operatively connected with the door, means on said body for preventing movement of the rocker whereby said door is held closed during separation of said members, a spacer member pivoted on said frame, a stop on said frame for engagement by said spacer member in one position of said spacer member whereby to produce a positive closing of the door during the return of the body from tilted position, said spacer member being free of the stop when in another position whereby no positive closing of the door is produced during the return of the body from tilted position.

10. A dump vehicle as in claim 9, in which said stop includes a cushioning device.

11. In a dump vehicle, a frame, a body, members on said body and frame for providing laterally spaced fulcrums about which the body may tilt, a side door pivoted on said body, a rocker pivoted on said body and connected to said door, disengageable means on said body operating into engagement of said rocker during the tilting of the body about the fulcrum at the side opposite side door for preventing opening movement of the door, and means on said frame for controlling the movement of said rocker during tilting about the fulcrum at the side adjacent said door and for holding the rocker against movement during normal transport and including compression members, said frame means including a cushioning device for said compression members.

12. In a dump vehicle, a frame structure, a body structure, separable fulcrum members on said structure whereby the body structure may tilt relative to the frame, a door pivotally mounted on said body structure to fold down for dumping, a rocker member pivoted on said body structure at the fulcrum axis adjacent said door, means for connecting said rocker member and door, and a stop movably secured on the frame structure for engagement by the rocker member to hold the door closed during transport, said rocker member remaining motionless with the frame and engaged with said stop during an initial stage of tilting of the body about said fulcrum members adjacent the door and during a final stage of return of the body from such tilted position and being effective through said connecting means while so motionless to control the door.

13. In a dump vehicle, a frame, a body, separable fulcrum members on said frame and body, a door pivotally mounted on said body to fold down for dumping and having a depending extension, a rocker member pivoted on said body substantially at the axis of said fulcrum members, said rocker member having an abutment face and a cam surface, positive means for connecting the rocker member and the depending extension, and a stop on the frame for engagement with said rocker member, said stop being movable relative to the frame between effective and non-effective positions, said abutment face operating in compression upon said stop during a return of the body from tilting about said fulcrum members to produce a closing of the door, said cam surface engaging said stop when the latter is in effective position during the lowering of the body adjacent said fulcrum members whereby to produce a rocking movement of said member and closure of the door and being free of engagement when said stop is in non-effective position, said rocker member acting through said connecting means for producing a positive closure of the door when the stop is in effective position.

14. In a dump vehicle, a frame, a body, said frame and body having separable fulcrum members for providing a fulcrum about which the body may tilt for dumping, a door pivotally mounted on said body, a door control device comprising a member on the body and a member on the frame, a latch operated upon separation of said fulcrum members for holding the door control member on the body for preventing opening of the door, said door control member on the frame during tilting about said fulcrum operating to hold said latch out of such holding engagement whereby the door may open under the control of said devices.

15. In a dump vehicle, a frame, a body, a door pivotally mounted on said body, separable fulcrum members on said body and frame adjacent said door and about which the body may tilt for dumping and which are separated when the body is raised adjacent thereto, a door control device comprising members carried by the body and frame, a latch on the body engageable with the device, and means for selectively presenting said latch in operative and inoperative positions during raising of the body adjacent said fulcrum members, said latch in operative position then engaging the said member on the body to prevent opening of the door and in inoperative position then permitting opening of the door, said door control device including means on the frame for automatically and positively moving the latch from operative to inoperative position during return of the body from raised position adjacent said fulcrum members.

16. In a dump vehicle, a frame, front and rear bolsters mounted on said frame, a body, said rear bolster mounting including means whereby the bolster and body may rock about a transverse axis, members on said bolsters and body for providing laterally spaced fulcrums about which the body may tilt for lateral dumping, latch bars slidable in said bolsters transversely of the vehicle, lever arms rockable in spaced transverse upright planes and connected with said latch bars for moving the same into selected positions for controlling the direction of tilting of the body, and means for coordinately rocking said lever arms, said lever arm cooperative with the latch bar for the rear bolster including a pivot connection which is substantially coincident with said transverse axis when said rear latch bar is in position for rearward tilting of the body.

17. In a dump vehicle, a frame, hollow front and rear bolsters mounted on said frame, a body, the mounting of said rear bolster including pivot means for permitting said rear bolster to rock about a transverse axis, cooperative means on said body and bolsters for providing laterally spaced fulcrums about which the body may tilt for lateral dumping to either side, front and rear latch bars located in and slidable within said bolsters and operative for preventing disengagement of said fulcrum members whereby to control the direction of tilting of said body, and means on the frame for moving said latch bars and including a pivot connection which is coaxial with said transverse axis when the bars are in position for tilting of the body about said transverse axis.

18. In a dump vehicle, a frame, a body, cooperative means adjacent the front of said frame and body for providing laterally spaced fulcrums about which the body may tilt for lateral dumping, a rear bolster member pivotally connected to said frame, interengaging means on said rear bolster and body whereby the body may tilt about laterally spaced fulcrums coaxial with said axes for lateral dumping, and whereby said body and bolster may tilt together for rear dumping, and latches for determining the direction of tilting and including actuating means on said rear bolster member pivoted on an axis parallel to said bolster member pivot when the latches are in position for rear dump.

19. In a dump vehicle, a frame, a body, members on said frame and body for providing a fulcrum adjacent one side of the vehicle about which said body may tilt for dumping and permitting a raising of the body relative to the frame adjacent said fulcrum, a downfolding door pivoted on said body adjacent said fulcrum, and door controlling devices for positively closing the door during the return of the body from tilting about said fulcrum and during lowering of the body after raising at the fulcrum side and for maintaining the door closed during transport, said devices including means which may be shifted between effective and non-effective positions whereby said devices are rendered ineffective for positively closing said door when said means is in ineffective position, and also including means on said frame, body and door cooperating for preventing accidental shifting of said shiftable means while the body is in transport position.

20. In a dump vehicle, a frame, a body, members on said body and frame for providing a fulcrum about which said body may tilt, a downfolding door pivoted on said body, and door controlling devices operating in compression for positively closing the door during return of the body from tilted position and for maintaining the door closed during transport, said devices including a compression element and means shiftably connecting the compression element to said frame so that the said element may be shifted for rendering said devices inoperative to close the door, said element being held against shifting movement by the body and frame when the body is in transport position.

21. In a dump vehicle, a frame, a body, members on said body and frame for providing a fulcrum about which said body may tilt, a downfolding door pivoted on said body, and door controlling devices operating in compression for positively closing the door during return of the body from tilted position and for maintaining the door closed during transport, said devices including a compression element pivotally connected to the frame and which may be shifted for rendering said devices inoperative to close the door, said element being held against shifting movement by the body and frame when the body is in transport position.

22. In a dump vehicle, a frame, a body, members on said body and frame for providing a fulcrum adjacent one side of said vehicle about which said body may tilt for lateral dumping, a downfolding side door pivoted on said body at the side of the vehicle opposite said fulcrum, and door controlling devices operating in compression for positively closing the door during return of the body from tilted position and for maintaining the door closed during transport, said devices including a compression element and means shiftably connecting the said element to said frame so that the element may be shifted for rendering said devices inoperative to close the door, said element being held against shifting movement by the body and frame when the body is in transport position.

23. In a dump vehicle, a frame, a body, separable fulcrum members on said frame and body, a door pivotally mounted on said body to fold down for dumping and having a depending extension, a rocker member pivoted on said body, positive means for connecting the rocker member and the depending extension, a resiliently operative stop on the frame for engagement by said rocker member whereby to produce a positive closing of the door during the return of the body from tilted position, and means on the body to limit the opening movement of the door, said connecting means operating to separate said rocker member and stop during further tilting movement of the body after the door encounters said limiting means.

24. In a dump vehicle, a frame structure, a body, members on said body and frame for providing laterally spaced fulcrums about which the body may tilt, a downfolding side door pivoted on said body, and door control devices for producing a positive closing movement of the door, if open, during the return of the body from tilting about either said fulcrums and operative to hold the door closed during normal transport, said devices also including a latch carried by the body and cooperating with the other said devices and a portion of the frame structure and held thereby in inoperative position while the body is in transport position and during tilting about the adjacent fulcrum, said latch automatically moving into operative position for holding the door closed during tilting about the opposite fulcrum and being displaced from operative position during the return of the body from tilted into transport position.

25. In a dump vehicle, a frame structure, a body structure, separable fulcrum members on said structure whereby the body structure may tilt relative to the frame, a door pivotally mounted on said body structure to fold down for dumping, a rocker member pivoted on said body structure, means for connecting said rocker member and door, an abutment element carried by one of said structures and movable separately from the rocker member selectively between two positions, and a stop on the frame structure for engaging said abutment element when said element is in one position, said rocker cooperating with the abutment element when one said element is in one position to hold the door closed during transport, to control the opening of the door during tilting of the body structure, and to positively close the door during return of the body from tilted position, said abutment element when in another position being ineffective to cause the rocker member to close the door during such return.

26. In a dump vehicle, a frame, a body, said body being tiltable toward either side relative to the frame, a side door pivoted on the body, and door control devices on the frame and body, said devices including a member pivoted on the frame and rockable between effective and non-effective positions, said member when in effective position causing a positive closing of the door during the return of the body from tilting toward either side and when in non-effective position permitting such return of the body without causing a closing of the door, said devices also including a normally inoperatve latch for selectively preventing and permitting opening of the door during tilting of the body toward the opposite side therefrom, said latch when selectively presented to prevent the door movement being automatically moved into position for preventing opening of the door during the initial tilting movement of the body and moved back into its normally inoperative position at the completion of the return movement of the body.

27. In a dump vehicle, a frame, a body, a door pivotally mounted on said body, said body being raisable with respect to the frame adjacent said door, a door control device comprising members carried by the body and frame, a latch on the body engageable with the door control device, and means for selectively presenting said latch in operative and inoperative positions during such raising of the body, said latch in operative position then engaging the said member on the body to prevent opening of the door and in inoperative position then freeing said member on the body to permit opening of the door, said member on the frame including a portion operative for positively moving the latch from operative to inoperative position during return of the body from raised position.

28. In a dump vehicle, a frame, a body, a door pivotally mounted on said body, said body being raisable with respect to the frame adjacent said door, a door control device comprising members carried by the body and frame, said members on the frame including a stop and a movable abutment which in one position is located between the stop and a member on the body and operative for effecting a positive closing of the door during return of the body from raised position, said abutment member in another position being free of the stop and said member carried by the body so that no positive closing of the door occurs during the return of the body from raised position, and movable means for holding said abutment in position.

HENRY FORT FLOWERS.